March 13, 1945.  W. L. ZINK ET AL  2,371,206
TRACTOR MOWER
Filed June 1, 1940
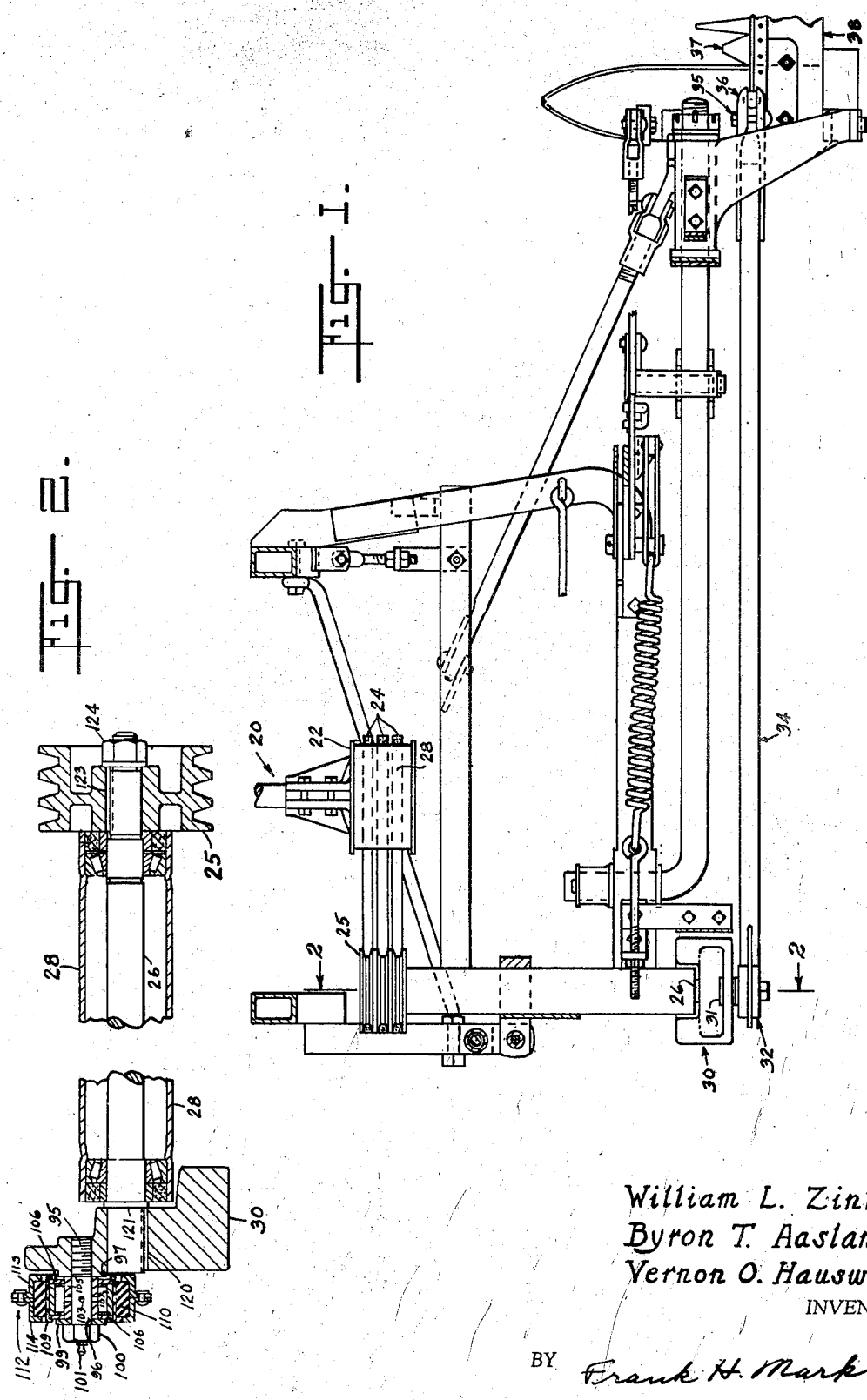
William L. Zink
Byron T. Aasland
Vernon O. Hauswirth
INVENTORS
BY Frank H. Marks
ATTORNEY.

Patented Mar. 13, 1945

2,371,206

UNITED STATES PATENT OFFICE 2,371,206

TRACTOR MOWER

William L. Zink, Plano, and Byron T. Aasland and Vernon O. Hauswirth, Kankakee, Ill., assignors to Sears, Roebuck and Co., Chicago, Ill., a corporation of New York Application June 1, 1940, Serial No. 338,354

5 Claims. (Cl. 308—184)

This invention pertains to farm implements, and is concerned more particularly with those of the tractor mounted type.

An object of our invention involves the provision of an improved pitman connection affording a shock-absorbing universal joint.

Further objects and advantages of the invention will appear as the description proceeds.

The invention will be better understood upon reference to the following description and accompanying drawing, in which:

Fig. 1 is a fragmentary plan sectional view of a mower provided with a pitman connection in accordance with our invention; and Fig. 2 is a sectional view taken as indicated by the line 2—2 in Fig. 1 and turned clockwise 90°.

Referring now more particularly to the drawing, there is illustrated the rear part of a tractor 20 having a propeller shaft power take-off extension on which is mounted a pulley 22. Belts 24 are trained about said pulley and also about a driven pulley 25 mounted on a driven shaft 26. The driven shaft 26 is journaled in a steel or other suitably strong torsion tube 28, said shaft terminating rearwardly in a flywheel 30, to which is eccentrically connected as at 31 the drive end 32 of a pitman 34. A clamp head 35 at the driven end of the pitman has a universal ball-and-socket connection at 36 with the movable knife 37 slidably supported by the cutter bar 38 of a mower. The connected ends and intermediate portion of the pitman are preferably integrally united, by welding or otherwise.

It is evident from the structure thus far recited that the knife 37 is normally reciprocated in response to rotation of the pulley 22.

For connection with the pitman 34, the flywheel 30 carries a crank pin which may be in the form of a bolt 95 extending outwardly as at 96 where it carries a roller bearing 97 held in place as by the washer 99 and bolt head 100, the latter, if desired, being provided with a lubricant fitting 101 leading to oil recesses 103 in the crank pin and bearing sleeve 105. The sleeve 105 forms the inner race of the bearing 97, the ends 106 and outer race 107 being retained in assembly by a shell 109 whose ends are beaded or flanged inward. Vulcanized to the shell 109 is a resilient rubber collar 110 tightly clamped within a shell comprising a cup 112 formed on an integral extension 113 on the pitman 34 and a mating cup 114 riveted or otherwise suitably connected to the cup 112. This rubber connection affords a universal shock-absorbing self-alining joint between the bearing and the pitman. When the parts are assembled as thus described, the pitman is connected to the flywheel by a bearing combined with a shock-absorbing universal joint which enables the bearing to function properly notwithstanding any changes in angularity of the pitman relative to the crank pin 95.

The flywheel 30 is suitably keyed as at 120 to the shaft and is secured thereon by a drive or other suitable fit in abutment with a shaft collar or flange 121.

The pulley 25 is keyed as at 123 on the other end of the shaft 26 and retained in place as by a nut 124 which maintains the pulley 25 in proper assembly with the shaft and the tube.

Various modifications may suggest themselves to those skilled in the art without departing from the spirit of our invention, and, hence, we do not wish to be restricted to the specific form shown or uses mentioned, except to the extent indicated in the appended claims, which are to be interpreted as broadly as the state of the art will permit.

We claim:

1. A pair of relatively rotatable members, a bearing rotatably engaged with one of said members with means retaining said bearing against displacement in axial direction, and a shock-absorbing self-alining collar of resilient flexible material fitted between the bearing and the other of said members and vulcanized to said bearing, the bearing and said other member being separated from each other at planes adjacent the end surfaces of the collar by annular spaces leaving at least a portion of each end surface of said collar unconfined by either of said separated parts, and said resilient collar constituting the sole means maintaining the bearing in operative relation to said other member.

2. A pair of relatively rotatable members, a bearing rotatably engaged with one of said members with means retaining said bearing against displacement in axial direction, and a shock-absorbing self-alining collar of resilient flexible material fitted between the bearing and the other of said members and vulcanized to said bearing, said other member having an annular channel in which said collar is seated, the side walls of said channel extending only part way toward said bearing, leaving the end surfaces of said collar partially unconfined and said collar constituting the sole means maintaining the bearing in operative relation to said other member.

3. In a mower including a drive shaft, a flywheel thereon, a crank on said flywheel, a race around said crank, rotary bearing elements between and engaging said crank and race, means including a shell retaining said crank, race and elements in assembly, and a pitman: a resilient rubber collar vulcanized to said shell, said pitman having an annular channel in which the collar is seated, the side walls of said channel extending only part way toward the said shell of the bearing, leaving the end surfaces of said collar partially unconfined, said collar constituting the sole means maintaining the bearing in operative relation to the pitman.

4. In a mower including a drive shaft, a flywheel thereon, a crank on said flywheel, a race around said crank, rotary bearing elements between and engaging said crank and race, means including a shell retaining said crank, race and elements in assembly, and a pitman: a resilient rubber collar vulcanized to said shell, said pitman providing an annular seat for said collar, said seat being substantially channel-shaped in cross-section and being formed of two parts separable at a transaxial plane, together with clamping means drawing said parts together in axial direction and causing the side walls of the channel to compress the collar axially, said side walls only partially overlapping the end surfaces of said collar leaving the remainder of said end surfaces unconfined and said collar constituting the sole means maintaining the bearing in operative relation to said pitman.

5. In a mower including a drive shaft, a flywheel thereon, a crank on said flywheel and a pitman having a portion encompassing said crank and adapted to be disposed in coaxial relation thereto, a bearing rotatably engaged with the crank with means retaining said bearing against displacement in axial direction, and a shock-absorbing self-alining collar of resilient flexible material fitted between the bearing and the pitman and vulcanized to said bearing, said pitman having an annular channel in which the collar is seated, a portion of said channel being separable from the remainder at a transaxial plane, clamping means operative to draw the portions of the channel together axially with said collar clamped between the side walls of the channel, said side walls extending only part way toward the said bearing, leaving an annular space between said side walls and the bearing with the intervening end surfaces of the collar unconfined.

WILLIAM L. ZINK.
BYRON T. AASLAND.
VERNON O. HAUSWIRTH.